United States Patent
Chen et al.

(10) Patent No.: US 8,220,824 B2
(45) Date of Patent: Jul. 17, 2012

(54) FOLDING WAGON

(75) Inventors: Zhaosheng Chen, El Monte, CA (US); Yishun Chen, El Monte, CA (US)

(73) Assignee: Bam Brokerage, Inc., Mission Viejo, CA (US)

( * ) Notice: Subject to any disclaimer, the term of this patent is extended or adjusted under 35 U.S.C. 154(b) by 0 days.

(21) Appl. No.: 13/204,913

(22) Filed: Aug. 8, 2011

(65) Prior Publication Data

US 2011/0285112 A1 Nov. 24, 2011

Related U.S. Application Data

(63) Continuation of application No. 12/287,579, filed on Oct. 10, 2008, now Pat. No. 8,011,686.

(51) Int. Cl.
*B62B 3/02* (2006.01)

(52) U.S. Cl. ........................................ 280/651; 280/640

(58) Field of Classification Search ............... 280/87.01, 280/651, 640
See application file for complete search history.

(56) References Cited

U.S. PATENT DOCUMENTS

| | | |
|---|---|---|
| 1,771,836 A | 7/1930 | Beckham et al. |
| 1,919,103 A | 7/1933 | Dolge |
| 1,998,269 A | 4/1935 | Brown |
| 2,016,232 A | 10/1935 | Floyd |
| 2,020,766 A | 11/1935 | Brown |
| 2,036,455 A | 4/1936 | Brown |
| 2,049,683 A | 8/1936 | Baumgardner |
| 4,735,426 A | 4/1988 | McConnell |
| 5,222,748 A | 6/1993 | Johnson |
| 5,649,718 A * | 7/1997 | Groglio ........................ 280/641 |
| 6,179,374 B1 | 1/2001 | Tang |
| 6,260,566 B1 | 7/2001 | LaFave et al. |
| 6,354,619 B1 | 3/2002 | Kim |
| 6,491,318 B1 | 12/2002 | Galt et al. |
| D551,723 S | 9/2007 | Schlegel et al. |
| D551,724 S | 9/2007 | Seckel et al. |
| 7,547,037 B2 | 6/2009 | Poppinga et al. |
| 7,625,033 B2 | 12/2009 | Michelau et al. |
| 7,731,221 B2 * | 6/2010 | Bess ............................ 280/651 |
| 7,770,913 B2 | 8/2010 | Cannon |
| 8,011,686 B2 * | 9/2011 | Chen et al. .................... 280/651 |
| 2003/0025301 A1 | 2/2003 | Banuelos, III |
| 2008/0217886 A1 | 9/2008 | Poppinga et al. |
| 2010/0090444 A1 | 4/2010 | Chen et al. |
| 2010/0156069 A1 | 6/2010 | Chen |

* cited by examiner

*Primary Examiner* — Jeffrey J Restifo
(74) *Attorney, Agent, or Firm* — Howard & Howard Attorneys PLLC

(57) ABSTRACT

A folding wagon has a folding frame with a stowed position and an open position. The folding frame comprises a pair of front and rear vertical support. The folding frame further comprises a pair of front supplemental links and a pair of rear supplemental links. A plurality of flatbed supports form a central flatbed support joint in the middle of the wagon. The central flatbed support joint folds upward when the folding frame is being configured into stowed position, and the plurality of flatbed supports are pivotally connected to the pair of front vertical supports and the pair of rear vertical supports. Wheels attach to the folding frame.

16 Claims, 3 Drawing Sheets

FOLDING WAGON

CROSS-REFERENCE TO RELATED APPLICATIONS

The present continuation application claims priority to U.S. Non-Provisional patent application Ser. No. 12/287,579, filed Oct. 10, 2010, the entire disclosure of which is hereby incorporated by reference.

DISCUSSION OF RELATED ART

The pull wagon has been used for transporting groceries, small children, gardening supplies and the like for many centuries. Typically, the wagon has a wagon bed with a handle and four wheels. The wagon is multi-functional, pedestrian and generally a neighborhood vehicle. Taking the wagon on camping trips, to the beach or anywhere would generally require loading it into an automobile. Because the traditional pull wagon is not collapsible, the space limitations in a car may sometimes make the transportation of the wagon cumbersome and difficult.

As an improvement to the traditional pull wagon, a variety of folding versions have been invented. For example, a folding child wagon as described in U.S. Pat. No. 5,957,482 filed Aug. 30, 1996 to Mr. Shorter (the disclosure of which is incorporated herein by reference) provides a wagon with a transversely divided in hinged for folding from a flat position for use to a position which the two bed halves are in face-to-face contact for storage. Furthermore, the removable rail modules may be removable for storage.

Some wagons are capable of folding into a small compact area. For example, Ritucci shows in U.S. Pat. No. 6,845,991, filed Mar. 17, 2003 a folding wagon that has folding wheels which can be folded for storage such that the entire package appears to fold into a briefcase like module.

Other inventions such as Banuelos' folding wagon of application Ser. No. 09/732,556, publication number 2003/0025301 having a filing date of Dec. 8, 2000 (the disclosure of which is incorporated herein by reference) provides a net for storing cargo with the net capable of extending between the bottom panel assembly and the upper rail for forming a cargo compartment. A worldwide need for folding wagons has provided a panoply of possibilities. Numerous designs having folding wheels, folding beds, and folding frames have been developed.

SUMMARY OF THE INVENTION

A folding wagon has a folding frame with a stowed position and an open position. The folding frame comprises a pair of front and rear vertical support, a front upper horizontal support extending between the pair of front vertical supports, a rear horizontal support extending between the pair of rear vertical supports, and a pair of lower horizontal support. The folding frame further comprises a pair of front supplemental links and a pair of rear supplemental links. The pair of front supplemental links are pivotally connected to diagonal folding members, and the pair of rear supplemental links are pivotally connected to diagonal folding members. The pair of front supplemental links are pivotally connected to the pair of front vertical support and the pair of rear supplemental links are pivotally connected to the pair of rear vertical supports. A plurality of flatbed supports form a central flatbed support joint in the middle of the wagon. The central flatbed support joint folds upward when the folding frame is being configured into stowed position, and the plurality of flatbed supports are pivotally connected to the pair of front vertical supports and the pair of rear vertical supports. Wheels attach to the folding frame.

For cover, four telescopic bushing can be mounted on the pair of front vertical support and on the pair of rear vertical support. The pair of front vertical support and the pair of rear vertical support are substantially hollow. Four telescopic extensions can be mounted in telescopic configuration on the telescopic bushing. Four telescopic bulbs can be mounted at a telescopic extension upper end. The telescopic extensions have a retracted position, retracting inside a hollow formed within the vertical support, and the telescopic extensions have an extended position protruding above the vertical support. A fabric canopy may have a top panel, and four sidewalls forming four corners. Each of the four corners receives one of the four telescopic bulbs. The four telescopic extensions flex toward the middle of the wagon for imparting a lodging force of the telescopic bulbs in each of the four corners. The telescopic bushings retard retraction when the telescopic extensions are flexed. Retraction is retarded by friction binding of the telescopic extensions against the bushing, and possibly also against the inside of the vertical hollow.

The folding wagon also has a plurality of flatbed supports. A plurality of lengthwise flatbed supports and a plurality of widthwise flatbed supports can support articles within the wagon bed. Preferably, there are eight lengthwise flatbed supports and four widthwise flatbed supports. The fabric canopy preferably has a trapezoidal side profile, but could also be rectangular shaped. Decorative trim can be used around the edge of the fabric canopy, and around the edge of the bag, and around the edge of the fabric bed. A handle assembly can be connected to the front of the wagon for manual control.

A fabric bag is mounted to the bag frame. The bag frame forms a rim for the fabric bag. The bag frame folds along with the wagon when the wagon is folded. The bag frame drops down when folded. The bag frame is connected to the folding frame. In the best mode of the folding frame, the folding frame comprises a number of diagonal supports that form a pair of X shaped members on each of the left and right side walls of the wagon when the wagon is in deployed position. The four bar mechanism of the diagonal supports maintains the diagonal supports in parallel to some of the other diagonal supports.

The following call out list of elements is used consistently throughout in the figures.
  22 Wheel Pivot Connection
  25 Wheel Rim
  26 Wheel Assembly
  28 Wheel Tire
  30 Folding Frame
  31 Vertical Support
  32 Upper Horizontal Support
  33 Lower Outside Horizontal Support
  37 Telescopic Bushing 38 Telescopic Extension
39 Telescopic Bulb
41 Bag Frame
42 Supplemental Link
43 First Diagonal Folding Member
44 Second Diagonal Folding Member
45 Third Diagonal Folding Member
46 Fourth Diagonal Folding Member
61 Lower Pivot Joint
62 Leaning Bar
63 Supplemental Link Outside Pivot Joint
65 Supplemental Link Inside Pivot Joint
66 Lower Major Pivot
67 Upper Major Pivot
68 Intermediate Major Pivot
69 Second Supplemental Link Inside Pivot Joint
72 Rear Inside Flatbed Support
73 Front Inside Flatbed Support
74 Central Flatbed Support Joint
75 Outside Flatbed Support Joint
77 Lengthwise Flatbed Support
78 Widthwise Flatbed Support
79 Flatbed Support Retainer Bar
82 Fabric Canopy
84 Fabric Bag
86 Fabric Upper Major Pivot Retainer Sleeve
88 Fabric Bed
91 Handle Grip
92 First Handle Joint
93 Second Handle Joint
94 Handle Yoke
95 Handle Stem
99 Handle Clip

DETAILED DESCRIPTION OF THE PREFERRED EMBODIMENT

Figure 1:
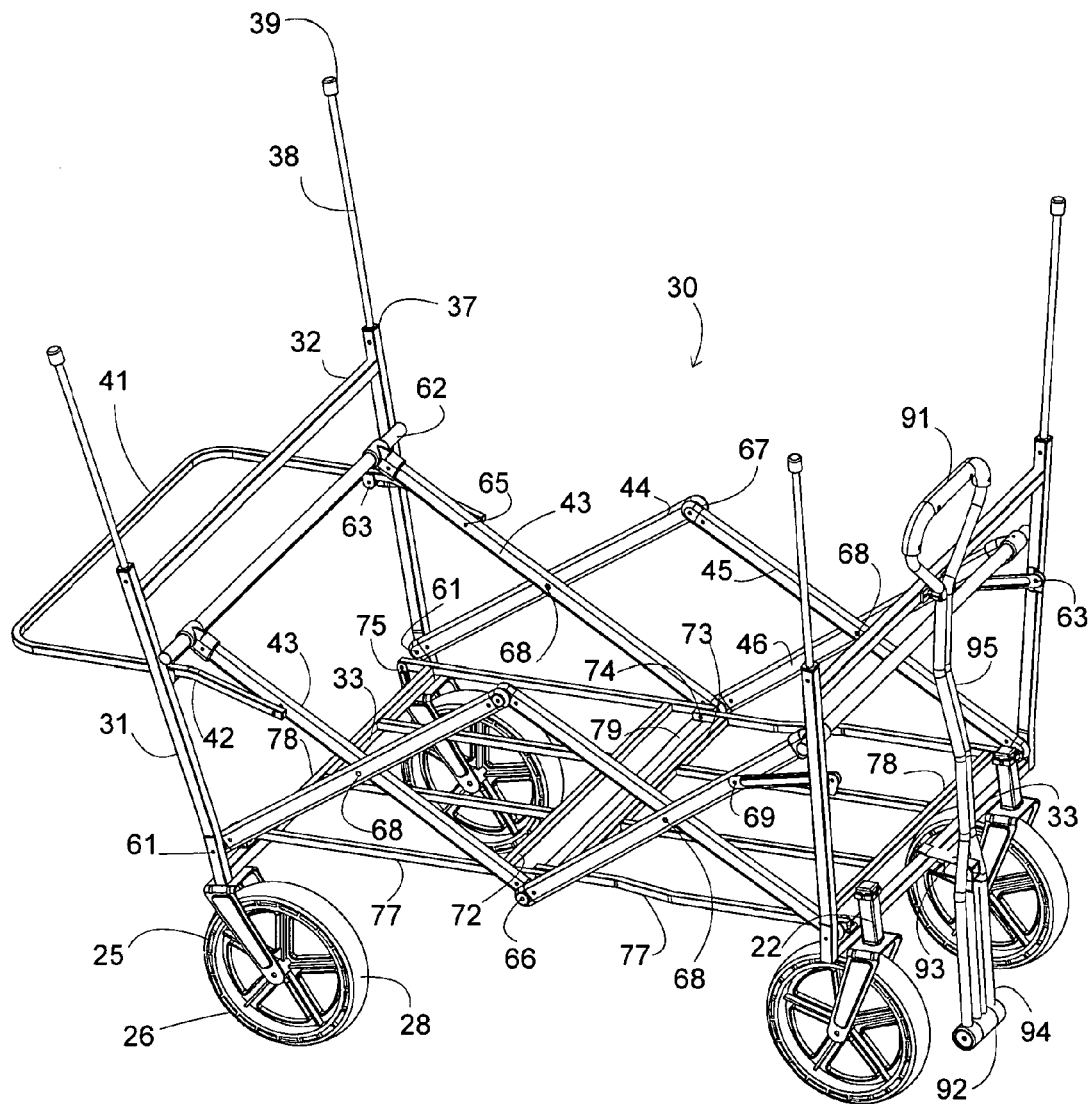
FIG. 1 is a perspective view of the present invention in open configuration.

The present invention is a folding wagon with a folding frame 30 and fabric components mounted to the folding frame by generally well known techniques in the art such as making a sleeve, use of grommets, or providing hook and loop connection straps. The folding wagon generally has an open position for general use, and a stowed position where the wagon is folded. When the wagon is opened as seen in FIG. 1, the wheels are spaced apart from each other and the front wheels are spaced apart from the rear wheels. In closed position, the front wheels and the rear wheels have an almost coaxial configuration. The front wheels fit between the rear wheels when the wagon is folded. The folded configuration also drops down the bag holder.

Figure 3:
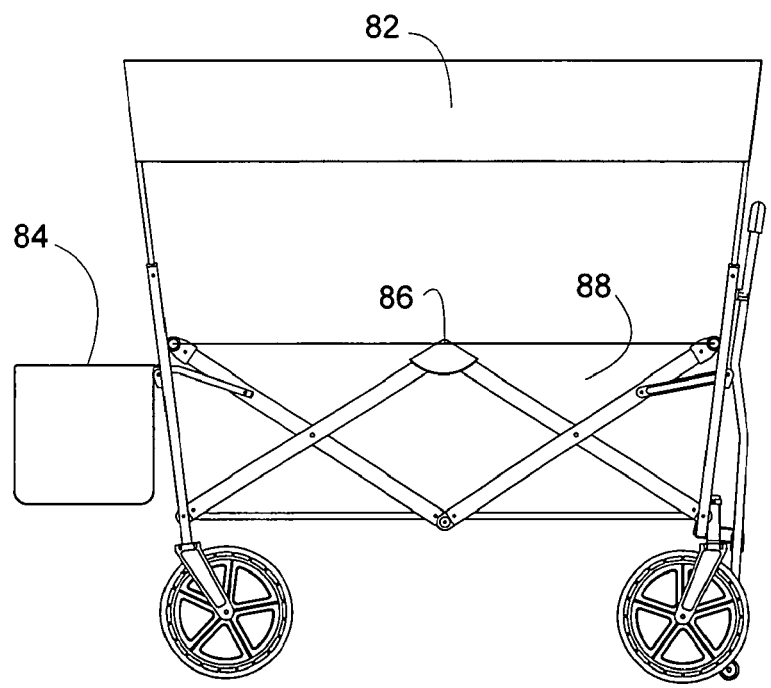
FIG. 3 is a side view of the present invention with all fabric members attached.
Figure 5:
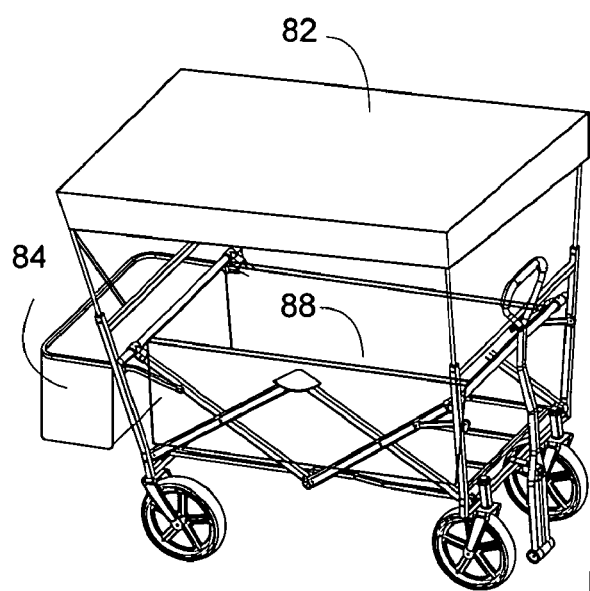
FIG. 5 is a perspective view of the present invention with all fabric members attached.

The present invention further has an extended position where the telescopic extensions 38 are extended away from the vertical supports 31. The vertical supports 31 are hollow and in retracted position, the telescopic extensions 38 are hidden within the vertical supports 31. The vertical supports 31 are preferably made of metal tubing having a square or rectangular cross-section. The vertical supports 31 have a telescopic bushing 37, which is an insert, preferably made of plastic, which generally permits movement, while restricting vertical telescopic movement when the vertical supports 31 are biased toward one another when the fabric canopy 82 is installed as seen in FIGS. 3, 5. The cloth fabric portions including the fabric canopy 82, the fabric bag 84, and the fabric bed 88 can all be removed for washing. The fabric bed 88 optionally includes bottom panels for supporting articles. The bottom panels can be made of hard plastic plates with foam soft covering over them. The bottom panels can be sewn into the fabric bed, or into pockets in the fabric bed. The bottom panels fold upwards in the middle of the bed for providing easy collapse of the wagon. A fabric strap extending through the fabric bed 88 can be provided for handgrip for closing the wagon. The fabric members may receive a sleeve or hook and loop connection to provide attachment to the folding frame 30. The folding frame 30 has vertical supports 31 at each of its four corners. The vertical supports are attached to wheel assemblies 26. The wheel assemblies preferably have a wheel pivot connection 22 on the front pair of wheels, and a rigid welded connection on the rear pair of wheels. The wheel assembly 26 includes a wheel rim 25 for receiving a wheel tire 28.

Besides supporting the wheels, the vertical supports 31 are rigidly connected to upper horizontal supports 32 at the four corners of the wagon. Opposing the upper horizontal supports are lower outside horizontal supports to form a trapezoidal frame. The upper horizontal supports 32 are preferably slightly longer than the lower outside horizontal supports 33 such that the vertical supports 31 are not perfectly vertical and extend away or otherwise tilt away from the middle of the wagon.

At the rear of the wagon is a bag frame 41 formed as a bent tube, which is bent preferably four times, with two major bends in the rear for defining a rectangular bag frame rim, and with two minor bends downward to meet at supplemental link inside pivot joints 65. The bag frame 41 is connected to the vertical supports 31 at a supplemental link outside pivot joint 63. The bag frame 41 has a front portion forming a pair of supplemental links 42. The supplemental links 42 are, in the rear of the wagon, in pivot connection between the first diagonal folding member 43 and the vertical support 31. On the other hand, in the front of the wagon, the supplemental links 42 are in pivot connection between the fourth diagonal folding member 46 and the vertical support 31. The supplemental links 42 in the front of the wagon connect to the fourth diagonal folding member 46 at a second supplemental link inside pivot joint 69. The supplemental links in the rear portion of the wagon connect to the first diagonal folding member by supplemental link inside pivot joints 65. The supplemental links connect to the folding members at a location between a pair of intermediate major pivots 68 and a leaning bar 62.

The folding frame 30 is assembled by a pair of diagonal folding member apparatus forming the left and right side of the wagon walls. The diagonal folding member apparatus is comprised of a first diagonal folding member 43 pivotally connected to a second diagonal folding member 44 at approximately a midpoint of the first diagonal folding member 43 and at approximately a midpoint of the second diagonal folding member 44 which is at the intermediate major pivot 68. The third diagonal folding member 45 and the fourth diagonal folding member 46 are also pivot connected at or near their midpoints at the intermediate major pivot 68. The first diagonal folding member 43 and second diagonal folding member 44 are connected to the third diagonal folding member 45 and the fourth diagonal folding member 46 at an upper major pivot and a lower major pivot. The lower major pivot 66 is a pivot connection between the first diagonal folding member 43 and the fourth diagonal folding member 46. The second diagonal folding member 44 is pivot connected to the third diagonal folding member 45 at an upper major pivot 67. The folding frame 30 also has connection to the vertical support 31 at the lower pivot joint 61 where the second diagonal folding member 44 is pivot connected to the vertical support 31. The third diagonal folding member 45 is pivot connected to the vertical support 31 at a lower pivot joint 61.

The handle assembly has a handle grip 91 connected to a handle stem 95 which terminates on a handle yoke 94 providing a folding connection at a first handle joint 92 with a lower stem which is connected to the second handle joint 93. The second handle joint 93 provides left to right swiveling and up-and-down swiveling. The first handle joint 92 provides up-and-down swiveling. Optionally, a handle clip mounted on the front upper horizontal support 32 provides handle storage when the wagon is in stowed position.

The flatbed assembly comprises a plurality of lengthwise flatbed supports 77 which as shown in FIG. 1 and in the preferred embodiment number eight in total with four in the front and four in the rear. The plurality of flatbed supports are preferably pivotally mounted to the vertical supports, equivalently either at the actual post of the vertical support, or indirectly mounted to the vertical support at the lower horizontal support. The lengthwise flatbed supports 77 in the rear half are connected to a rear inside flat flatbed support 72 and a widthwise flatbed support 78 at the rear of the wagon. The rear inside flatbed support 72 spans between the outermost pair of lengthwise flat bed supports 77. The innermost pair of lengthwise flatbed supports 77 span between the widthwise flatbed support 78 and the rear inside flatbed support 72. The structure of the front half of the flatbed support assembly is the same. The front inside flatbed support 73 spans between the outermost pair of lengthwise flatbed supports 77 in the front half, and analogously the innermost pair of lengthwise flatbed supports 77 span between the front inside flatbed support 73 and the widthwise flatbed support 78.

In the very middle of the flatbed assembly, the front lengthwise flatbed supports 77 and the rear lengthwise flatbed supports 77 hinge at the central flatbed support joint 74. Between the lower major pivot 66, a flatbed support retainer bar 79 passes and connects between the left and right pair of diagonal folding member walls. The flatbed support retainer bar 79 supports the central flatbed support joint 74. The front outer pair of lengthwise flatbed supports 77 and of the rear outer pair of lengthwise flatbed supports 77 both have an end closest to the major pivot 66 and the end preferably extends over the flatbed support retainer bar 79 so that the flatbed support retainer bar 79 can support the flatbed assembly.

In open position, the wagon has numerous pivot joints, and three leaning connections. The leaning connections are comprised of: the front and rear leaning bar 62 resting against the vertical support 31; and the lengthwise flatbed support 77 resting on the flatbed support retainer bar 79. The lengthwise flatbed supports 77 have a central flatbed support joint 74 that is preferably not coaxial and preferably slightly above the lower major pivot 66. The lower major pivot 66 preferably passes a bolt through its center to retain the flatbed support retainer bar 79 which is coaxial to the bolt and coaxial to the lower major pivot 66. For transforming the apparatus into stowed position, the strap handle is preferably connected to the middle of the flatbed support retainer bar 79, passing through an opening in the fabric bed 88 so that a user can pull up the entire apparatus to collapse it for storage.

Figure 2:
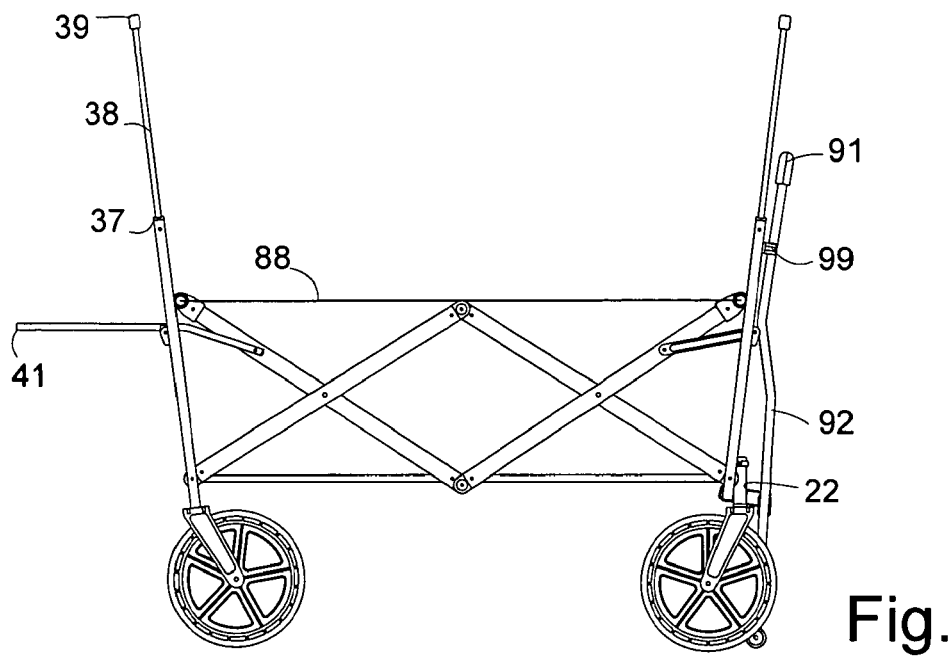
FIG. 2 is a side view of the present invention.

Before storing away the wagon in collapsed form, the user removes the fabric canopy 82. The fabric canopy 82 has a trapezoidal side profile as seen in FIG. 3. The trapezoidal side profile provides a smaller opening and a larger inside area similar to a fitted sheet on a mattress. Thus, the top portion of the fabric canopy 82 has a greater length than the bottom portion of the fabric canopy 82. After a user removes the fabric canopy 82, the user can optionally remove the fabric bag 84 from the rear of the wagon. The fabric bag 84, FIG. 3 is preferably connected to the wagon as a sleeve of fabric wrapped around the bag frame 41, FIG. 2. A user may also clip the handle stem 95 to the handle clip 99. The trapezoidal side profile fabric canopy 82 preferably matches in color with the fabric bed 88. The fabric bed 88 has rigid bottom panels. To take down the trapezoidal side profile fabric canopy 82, the user bends the telescopic bulbs 39 toward the middle of the wagon providing slack to remove one telescopic bulb 39 from a corner of the trapezoidal side profile fabric canopy 82. Once a quarter is removed, the rest of the fabric canopy 82 comes off easily.

Figure 4:
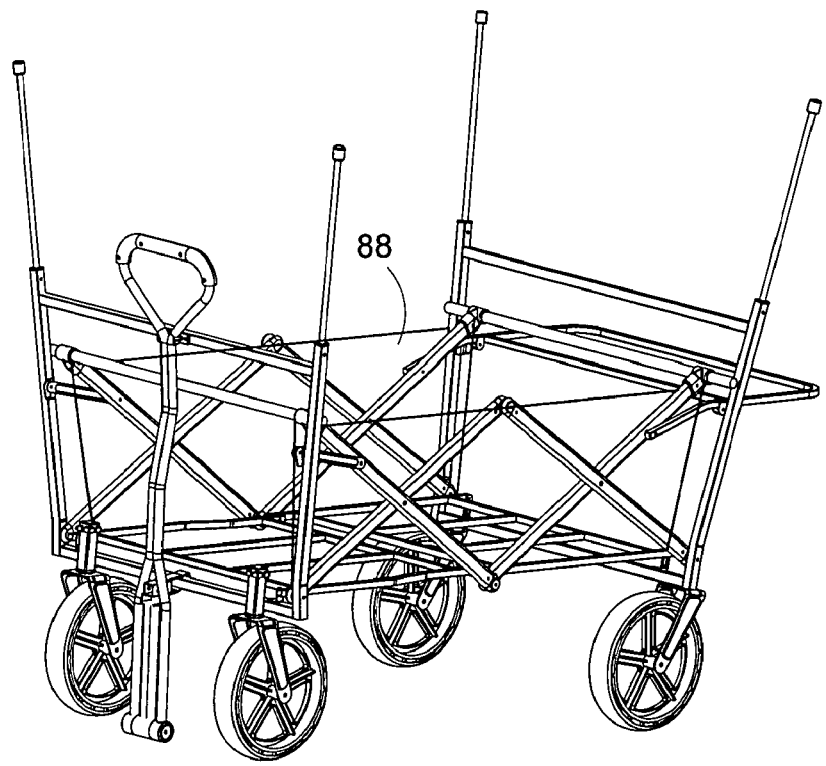
FIG. 4 is a perspective view of the present invention showing the location of the bed fabric member.

The fabric bed 88 further includes a fabric upper major pivot retainer sleeve 86 as seen in FIG. 3. The fabric upper major pivot retainer sleeve 86 preferably has an arc shaped lower portion with an angular top portion matching the angle between the second diagonal folding member 44 and the third diagonal folding member 45. The fabric bed 88 can also be partially or completely transparent for allowing viewing of articles within. The fabric bed 88 can also be shown in transparent fabric as seen in FIG. 4. FIG. 5 provides a partially transparent view of the fabric bed 88. The fabric bed 88 may also receive embroidery or screen printing for decorative effect.

The lower the joint 61 and the outside flatbed support joint 75 are preferably coaxial although they do not necessarily have to be. In the best mode, a long bolt passes through both of them to provide a single bolt axis. Each of the pivot connections can also be bolt connected or grommet connected, or pin connected, or rivet connected. A wide variety of pivot connections are available with rivet connections favored on light connection areas.

What is claimed is:

1. A folding wagon comprising:
   a. a folding frame having a stowed position and an open position; wherein the folding frame comprises a pair of front and rear vertical support, a front upper horizontal support extending between the pair of front vertical supports, a rear horizontal support extending between the pair of rear vertical supports, and a pair of lower horizontal support, namely a front lower horizontal support extending between the pair of front vertical supports, and a rear lower horizontal support extending between the pair of rear vertical supports; wherein the folding frame further comprises a pair of front supplemental links and a pair of rear supplemental links, wherein the pair of front supplemental links are pivotally connected to diagonal folding members, wherein the pair of rear supplemental links are pivotally connected to diagonal folding members, wherein the pair of front supplemental links are pivotally connected to the pair of front vertical support, wherein the pair of rear supplemental links are pivotally connected to the pair of rear vertical supports;
   b. a fabric bed having rigid bottom panels, wherein the fabric bed has a front fabric wall, a rear fabric wall, and a pair of substantially parallel sidewalls;
   c. a plurality of flatbed supports forming a central flatbed support joint in the middle of the wagon, wherein the central flatbed support joint folds upward when the folding frame is being configured into stowed position, wherein the plurality of flatbed supports are pivotally connected to the pair of front vertical supports and the pair of rear vertical supports; and
   d. wheels attached to the folding frame, further comprising four telescopic bushing mounted on the pair of front vertical support and on the pair of rear vertical support, wherein the pair of front vertical support and the pair of rear vertical support are substantially hollow; and further comprising four telescopic extensions, each mounted in telescopic configuration on each telescopic bushing; and further comprising four telescopic bulbs, each mounted at a telescopic extension upper end, wherein the telescopic extensions have a retracted position, retracting inside a hollow formed within the vertical support, and wherein the telescopic extensions have an extended position protruding above the vertical support; and further comprising a fabric canopy having a top panel, and four sidewalls forming four corners, wherein each of the four corners receives one of the four telescopic bulbs; wherein the four telescopic extensions flex toward the middle of the wagon for imparting a lodging force of the telescopic bulbs in each of the four corners, wherein the telescopic bushings retard retraction when the telescopic extensions are flexed.

2. The folding wagon of claim 1, wherein the fabric canopy has a trapezoidal side profile.

3. The folding wagon of claim 1, wherein the diagonal folding members form a pair of diagonal folding member apparatus, each diagonal folding member apparatus forming a left and right side wagon wall respectively, wherein each wagon wall comprises four diagonal folding members, namely a first diagonal folding member, a second diagonal folding member, a third diagonal folding member, a fourth diagonal folding member, wherein the first diagonal folding member and the second diagonal folding member are connected to the third diagonal folding member and a fourth diagonal folding member at an upper major pivot and a lower major pivot, wherein the lower major pivot is a pivot connection between the first diagonal folding member and the fourth diagonal folding member.

4. The folding wagon of claim 3, wherein the first diagonal folding member and the second diagonal folding member are connected near their midpoints at a first intermediate major pivot, wherein the third diagonal folding member and a fourth diagonal folding member are connected near their midpoints at a second intermediate major pivot.

5. The folding wagon of claim 3, wherein each third diagonal folding member is pivot connected to the vertical support at a front lower pivot joint, wherein each second diagonal folding member is pivot connected to the vertical support at a rear lower pivot joint.

6. A folding wagon comprising:
a. a folding frame having a stowed position and an open position; wherein the folding frame comprises a pair of front and rear vertical support, a front upper horizontal support extending between the pair of front vertical supports, a rear horizontal support extending between the pair of rear vertical supports, and a pair of lower horizontal support, namely a front lower horizontal support extending between the pair of front vertical supports, and a rear lower horizontal support extending between the pair of rear vertical supports; wherein the folding frame further comprises a pair of front supplemental links and a pair of rear supplemental links, wherein the pair of front supplemental links are pivotally connected to diagonal folding members, wherein the pair of rear supplemental links are pivotally connected to diagonal folding members, wherein the pair of front supplemental links are pivotally connected to the pair of front vertical support, wherein the pair of rear supplemental links are pivotally connected to the pair of rear vertical supports;
b. a fabric bed having rigid bottom panels, wherein the fabric bed has a front fabric wall, a rear fabric wall, and a pair of substantially parallel sidewalls;
c. a plurality of flatbed supports forming a central flatbed support joint in the middle of the wagon, wherein the central flatbed support joint folds upward when the folding frame is being configured into stowed position, wherein the plurality of flatbed supports are pivotally connected to the pair of front vertical supports and the pair of rear vertical supports; and
d. wheels attached to the folding frame, wherein the plurality of flatbed supports further comprises a plurality of lengthwise flatbed supports and a plurality of widthwise flatbed supports, wherein there are eight lengthwise flatbed supports and four widthwise flatbed supports.

7. A folding wagon comprising:
a. a folding frame having a stowed position and an open position; wherein the folding frame comprises a pair of front and rear vertical support, a front upper horizontal support extending between the pair of front vertical supports, a rear horizontal support extending between the pair of rear vertical supports, and a pair of lower horizontal support, namely a front lower horizontal support extending between the pair of front vertical supports, and a rear lower horizontal support extending between the pair of rear vertical supports; wherein the folding frame further comprises a pair of front supplemental links and a pair of rear supplemental links, wherein the pair of front supplemental links are pivotally connected to diagonal folding members, wherein the pair of rear supplemental links are pivotally connected to diagonal folding members, wherein the pair of front supplemental links are pivotally connected to the pair of front vertical support, wherein the pair of rear supplemental links are pivotally connected to the pair of rear vertical supports;
b. a fabric bed having rigid bottom panels, wherein the fabric bed has a front fabric wall, a rear fabric wall, and a pair of substantially parallel sidewalls;
c. a plurality of flatbed supports forming a central flatbed support joint in the middle of the wagon, wherein the central flatbed support joint folds upward when the folding frame is being configured into stowed position, wherein the plurality of flatbed supports are pivotally connected to the pair of front vertical supports and the pair of rear vertical supports;
d. wheels attached to the folding frame, further comprising a handle assembly having a handle grip connected to a handle stem which terminates on a handle yield providing a folding connection at a first handle joint, further comprising a lower stem connected to the second handle joint, wherein the second handle joint provides left to right swiveling and up and down swiveling, wherein the first handle joint provides up and down swiveling, wherein a handle clip is mounted on the front upper horizontal support to provide handle storage when the wagon is in stowed position.

8. A folding wagon comprising:
a. a folding frame having a stowed position and an open position; wherein the folding frame comprises a pair of front and rear vertical support, a front upper horizontal support extending between the pair of front vertical supports, a rear horizontal support extending between the pair of rear vertical supports, and a pair of lower horizontal support, namely a front lower horizontal support extending between the pair of front vertical supports, and a rear lower horizontal support extending between the pair of rear vertical supports; wherein the folding frame further comprises a pair of front supplemental links and a pair of rear supplemental links, wherein the pair of front supplemental links are pivotally connected to diagonal folding members, wherein the pair of rear supplemental links are pivotally connected to diagonal folding members, wherein the pair of front supplemental links are pivotally connected to the pair of front vertical support, wherein the pair of rear supplemental links are pivotally connected to the pair of rear vertical supports;

b. a fabric bed having rigid bottom panels, wherein the fabric bed has a front fabric wall, a rear fabric wall, and a pair of substantially parallel sidewalls; and c. a plurality of flatbed supports forming a central flatbed support joint in the middle of the wagon, wherein the central flatbed support joint folds upward when the folding frame is being configured into stowed position, wherein the plurality of flatbed supports are pivotally connected to the pair of front vertical supports and the pair of rear vertical supports;

d. wheels attached to the folding frame, further comprising a bag frame formed as a bent tube, wherein the bent tube forms the pair of rear supplemental links, one rear supplemental link at each end of the bent tube, wherein the pair of rear supplemental links extends rearwards from the wagon to form the bag frame; and further comprising a fabric bag mounted to the bag frame, wherein the bag frame forms a rim for the fabric bag, wherein the bag frame folds along with the wagon when the wagon is folded, wherein the bag frame drops down when folded.

9. A folding wagon comprising:

a. a folding frame having a stowed position and an open position; wherein the folding frame comprises a pair of front and rear vertical support, a front upper horizontal support extending between the pair of front vertical supports, a rear horizontal support extending between the pair of rear vertical supports, and a pair of lower horizontal support, namely a front lower horizontal support extending between the pair of front vertical supports, and a rear lower horizontal support extending between the pair of rear vertical supports; wherein the folding frame further comprises a pair of front supplemental links and a pair of rear supplemental links, wherein the pair of front supplemental links are pivotally connected to diagonal folding members, wherein the pair of rear supplemental links are pivotally connected to diagonal folding members, wherein the pair of front supplemental links are pivotally connected to the pair of front vertical support, wherein the pair of rear supplemental links are pivotally connected to the pair of rear vertical supports;

b. a plurality of flatbed supports forming a central flatbed support joint in the middle of the wagon, wherein the central flatbed support joint folds upward when the folding frame is being configured into stowed position, wherein the plurality of flatbed supports are pivotally connected to the pair of front vertical supports and the pair of rear vertical supports; and c. wheels attached to the folding frame, further comprising four telescopic bushing mounted on the pair of front vertical support and on the pair of rear vertical support, wherein the pair of front vertical support and the pair of rear vertical support are substantially hollow; and further comprising four telescopic extensions, each mounted in telescopic configuration on each telescopic bushing; and further comprising four telescopic bulbs, each mounted at a telescopic extension upper end, wherein the telescopic extensions have a retracted position, retracting inside a hollow formed within the vertical support, and wherein the telescopic extensions have an extended position protruding above the vertical support; and further comprising a fabric canopy having a top panel, and four sidewalls forming four corners, wherein each of the four corners receives one of the four telescopic bulbs; wherein the four telescopic extensions flex toward the middle of the wagon for imparting a lodging force of the telescopic bulbs in each of the four corners, wherein the telescopic bushings retard retraction when the telescopic extensions are flexed.

10. The folding wagon of claim 9, wherein the fabric canopy has a trapezoidal side profile.

11. The folding wagon of claim 9, wherein the diagonal folding members form a pair of diagonal folding member apparatus, each diagonal folding member apparatus forming a left and right side wagon wall respectively, wherein each wagon wall comprises four diagonal folding members, namely a first diagonal folding member, a second diagonal folding member, a third diagonal folding member, a fourth diagonal folding member, wherein the first diagonal folding member and the second diagonal folding member are connected to the third diagonal folding member and a fourth diagonal folding member at an upper major pivot and a lower major pivot, wherein the lower major pivot is a pivot connection between the first diagonal folding member and the fourth diagonal folding member.

12. The folding wagon of claim 11, wherein the first diagonal folding member and the second diagonal folding member are connected near their midpoints at a first intermediate major pivot, wherein the third diagonal folding member and a fourth diagonal folding member are connected near their midpoints at a second intermediate major pivot.

13. The folding wagon of claim 11, wherein each third diagonal folding member is pivot connected to the vertical support at a front lower pivot joint, wherein each second diagonal folding member is pivot connected to the vertical support at a rear lower pivot joint.

14. A folding wagon comprising:

a. a folding frame having a stowed position and an open position; wherein the folding frame comprises a pair of front and rear vertical support, a front upper horizontal support extending between the pair of front vertical supports, a rear horizontal support extending between the pair of rear vertical supports, and a pair of lower horizontal support, namely a front lower horizontal support extending between the pair of front vertical supports, and a rear lower horizontal support extending between the pair of rear vertical supports; wherein the folding frame further comprises a pair of front supplemental links and a pair of rear supplemental links, wherein the pair of front supplemental links are pivotally connected to diagonal folding members, wherein the pair of rear supplemental links are pivotally connected to diagonal folding members, wherein the pair of front supplemental links are pivotally connected to the pair of front vertical support, wherein the pair of rear supplemental links are pivotally connected to the pair of rear vertical supports;

b. a plurality of flatbed supports forming a central flatbed support joint in the middle of the wagon, wherein the central flatbed support joint folds upward when the folding frame is being configured into stowed position, wherein the plurality of flatbed supports are pivotally connected to the pair of front vertical supports and the pair of rear vertical supports; and c. wheels attached to the folding frame, wherein the plurality of flatbed supports further comprises a plurality of lengthwise flatbed supports and a plurality of widthwise flatbed supports, wherein there are eight lengthwise flatbed supports and four widthwise flatbed supports.

15. A folding wagon comprising:
a. a folding frame having a stowed position and an open position; wherein the folding frame comprises a pair of front and rear vertical support, a front upper horizontal support extending between the pair of front vertical supports, a rear horizontal support extending between the pair of rear vertical supports, and a pair of lower horizontal support, namely a front lower horizontal support extending between the pair of front vertical supports, and a rear lower horizontal support extending between the pair of rear vertical supports; wherein the folding frame further comprises a pair of front supplemental links and a pair of rear supplemental links, wherein the pair of front supplemental links are pivotally connected to diagonal folding members, wherein the pair of rear supplemental links are pivotally connected to diagonal folding members, wherein the pair of front supplemental links are pivotally connected to the pair of front vertical support, wherein the pair of rear supplemental links are pivotally connected to the pair of rear vertical supports;
b. a plurality of flatbed supports forming a central flatbed support joint in the middle of the wagon, wherein the central flatbed support joint folds upward when the folding frame is being configured into stowed position, wherein the plurality of flatbed supports are pivotally connected to the pair of front vertical supports and the pair of rear vertical supports; and
c. wheels attached to the folding frame, further comprising a handle assembly having a handle grip connected to a handle stem which terminates on a handle yield providing a folding connection at a first handle joint, further comprising a lower stem connected to the second handle joint, wherein the second handle joint provides left to right swiveling and up and down swiveling, wherein the first handle joint provides up and down swiveling, wherein a handle clip is mounted on the front upper horizontal support to provide handle storage when the wagon is in stowed position.

16. A folding wagon comprising:
a. a folding frame having a stowed position and an open position; wherein the folding frame comprises a pair of front and rear vertical support, a front upper horizontal support extending between the pair of front vertical supports, a rear horizontal support extending between the pair of rear vertical supports, and a pair of lower horizontal support, namely a front lower horizontal support extending between the pair of front vertical supports, and a rear lower horizontal support extending between the pair of rear vertical supports; wherein the folding frame further comprises a pair of front supplemental links and a pair of rear supplemental links, wherein the pair of front supplemental links are pivotally connected to diagonal folding members, wherein the pair of rear supplemental links are pivotally connected to diagonal folding members, wherein the pair of front supplemental links are pivotally connected to the pair of front vertical support, wherein the pair of rear supplemental links are pivotally connected to the pair of rear vertical supports;
b. a plurality of flatbed supports forming a central flatbed support joint in the middle of the wagon, wherein the central flatbed support joint folds upward when the folding frame is being configured into stowed position, wherein the plurality of flatbed supports are pivotally connected to the pair of front vertical supports and the pair of rear vertical supports; and
c. wheels attached to the folding frame, further comprising a bag frame formed as a bent tube, wherein the bent tube forms the pair of rear supplemental links, one rear supplemental link at each end of the bent tube, wherein the pair of rear supplemental links extends rearwards from the wagon to form the bag frame; and further comprising a fabric bag mounted to the bag frame, wherein the bag frame forms a rim for the fabric bag, wherein the bag frame folds along with the wagon when the wagon is folded, wherein the bag frame drops down when folded.

* * * * *